(12) United States Patent
Yang et al.

(10) Patent No.: US 12,389,429 B2
(45) Date of Patent: Aug. 12, 2025

(54) THIRD STAGE SIDELINK CONTROL INFORMATION DESIGN

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US)

( * ) Notice: Subject to any disclaimer, the term of this patent is extended or adjusted under 35 U.S.C. 154(b) by 409 days.

(21) Appl. No.: 18/011,464

(22) PCT Filed: Aug. 4, 2020

(86) PCT No.: PCT/CN2020/106741
§ 371 (c)(1),
(2) Date: Dec. 19, 2022

(87) PCT Pub. No.: WO2022/027215
PCT Pub. Date: Feb. 10, 2022

(65) Prior Publication Data
US 2023/0328760 A1    Oct. 12, 2023

(51) Int. Cl.
*H04W 72/25* (2023.01)
*H04W 72/02* (2009.01)

(52) U.S. Cl.
CPC ........... *H04W 72/25* (2023.01); *H04W 72/02* (2013.01)

(58) Field of Classification Search
CPC ............ H04L 5/0053; H04W 4/40–48; H04W 8/005; H04W 72/02; H04W 72/20; H04W 72/25; H04W 72/40; H04W 76/14; H04W 76/40; H04W 92/18
See application file for complete search history.

(56) References Cited

U.S. PATENT DOCUMENTS

| 2021/0219268 A1* | 7/2021 | Li | H04B 17/318 |
| 2023/0239072 A1* | 7/2023 | Xu | H04L 5/0051 |
| | | | 370/329 |

FOREIGN PATENT DOCUMENTS

| CN | 106165510 A | 11/2016 |
| CN | 110999357 A | 4/2020 |
| WO | 2020033704 A1 | 2/2020 |
| WO | 2020063611 A1 | 4/2020 |
| WO | 2020067816 A1 | 4/2020 |

OTHER PUBLICATIONS

Supplementary European Search Report—EP20948385—Search Authority—The Hague—Mar. 5, 2024.
(Continued)

*Primary Examiner* — Thomas R Cairns

(57) ABSTRACT

Aspects relate to mechanisms for a wireless communication device to configure and indicate sidelink control information (SCI) for sidelink communication within a slot over a sidelink channel. The SCI can include first stage SCI (SCI-1), second stage SCI (SCI-2), and third stage SCI (SCI-3). The SCI-1 may be transmitted within a control region of the slot, whereas the SCI-2 and the SCI-3 may be transmitted within a data region of the slot. The SCI-2 may include information for decoding SCI-3, including, for example, a resource size, modulation order, and rate-matching behavior of the SCI-3. The sidelink communication can further include sidelink data traffic that may be communicated in the data region of the slot.

30 Claims, 12 Drawing Sheets

(56) References Cited

OTHER PUBLICATIONS

Ericsson: "On 2-Stage PSCCH-I Design", 3GPP Draft, 3GPP TSG-RAN WG1 Meeting #94bis, R1-1811607, Ericsson—On 2-Stage PSCCH-I Design, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051519005, 5 pages, Observation 5, p. 4, list item 'a', p. 4, list item 'b', p. 3, Observation 1, the whole document.
Huawei, et al., "Sidelink Physical Layer Structure for NR V2X", 3GPP TSG RAN WG1 Meeting #96bis, R1-1903943, Xi'an, China, Apr. 8-12, 2019, Apr. 12, 2019 (Apr. 12, 2019), 17 Pages, the Whole Document.
International Search Report and Written Opinion—PCT/CN2020/106741—ISA/EPO—Apr. 25, 2021.
Sequans Communications: "On NR Sidelink Physical Layer Structure", 3GPP TSG RAN WG1 Meeting #99, R1-1913010, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019, 8 Pages, XP051820261, the whole document.

\* cited by examiner

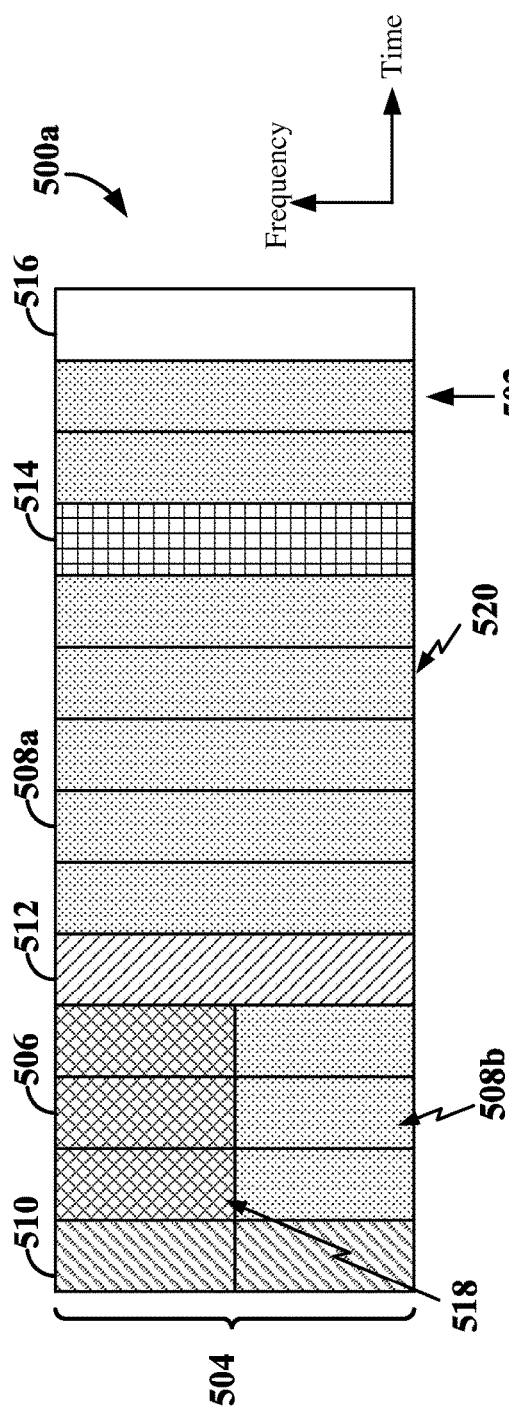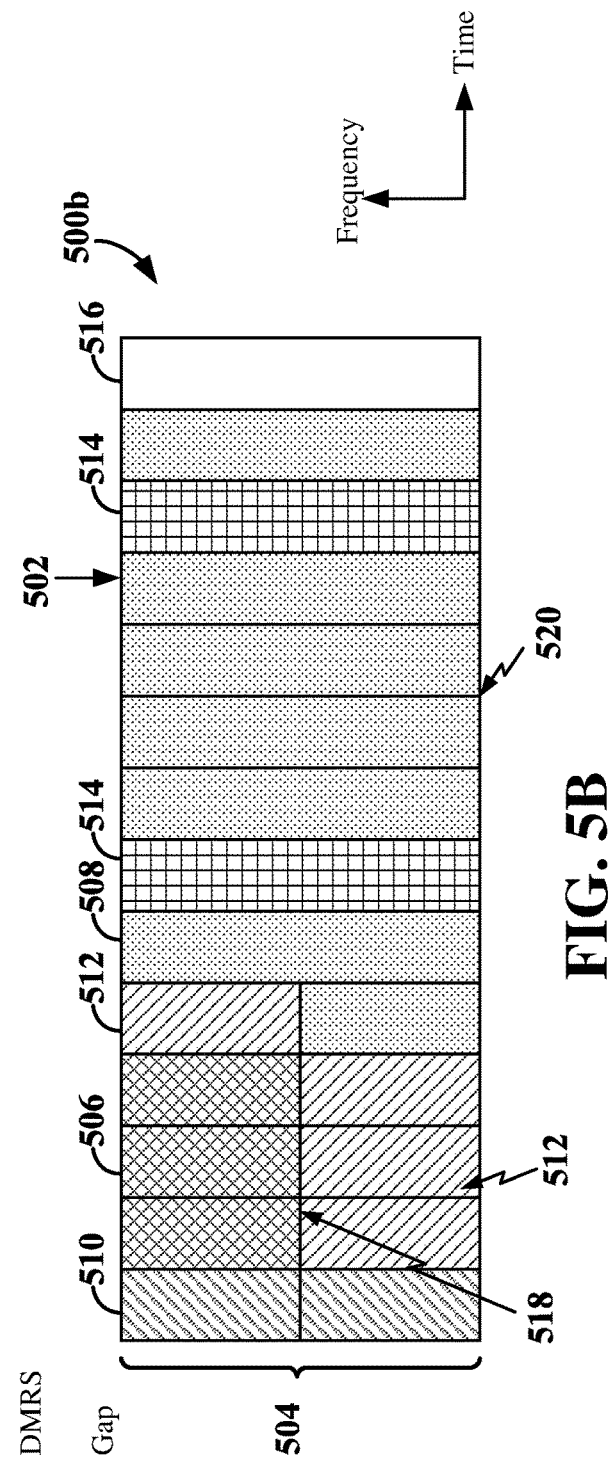
FIG. 5A
FIG. 5B

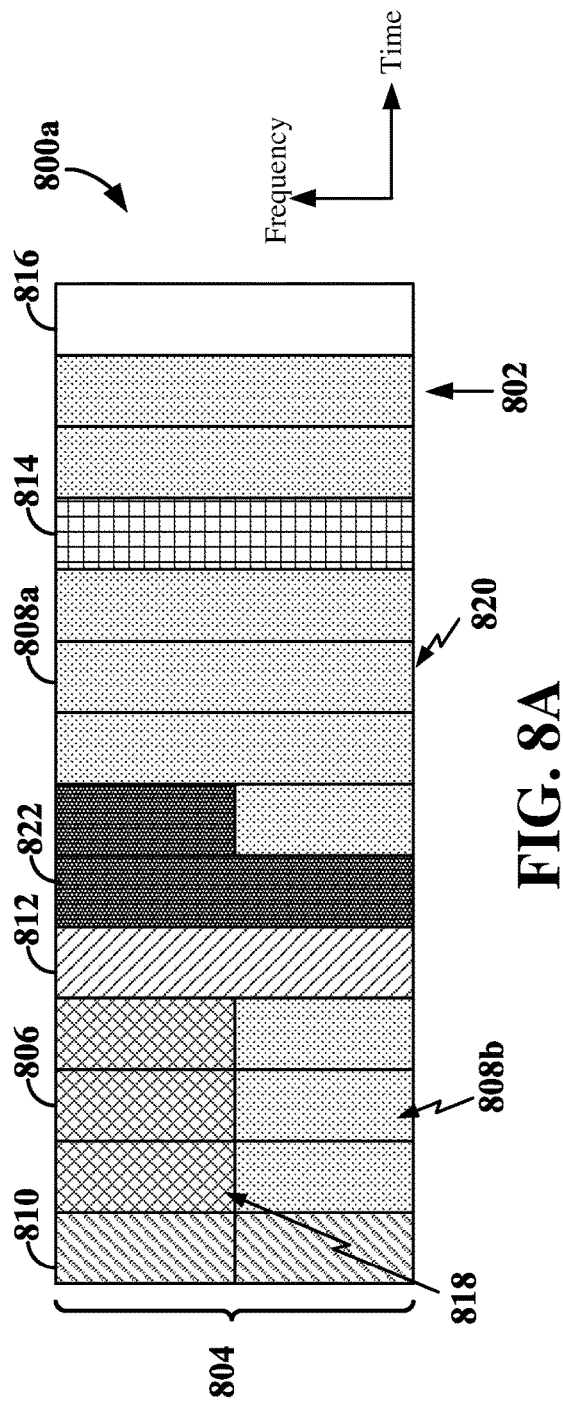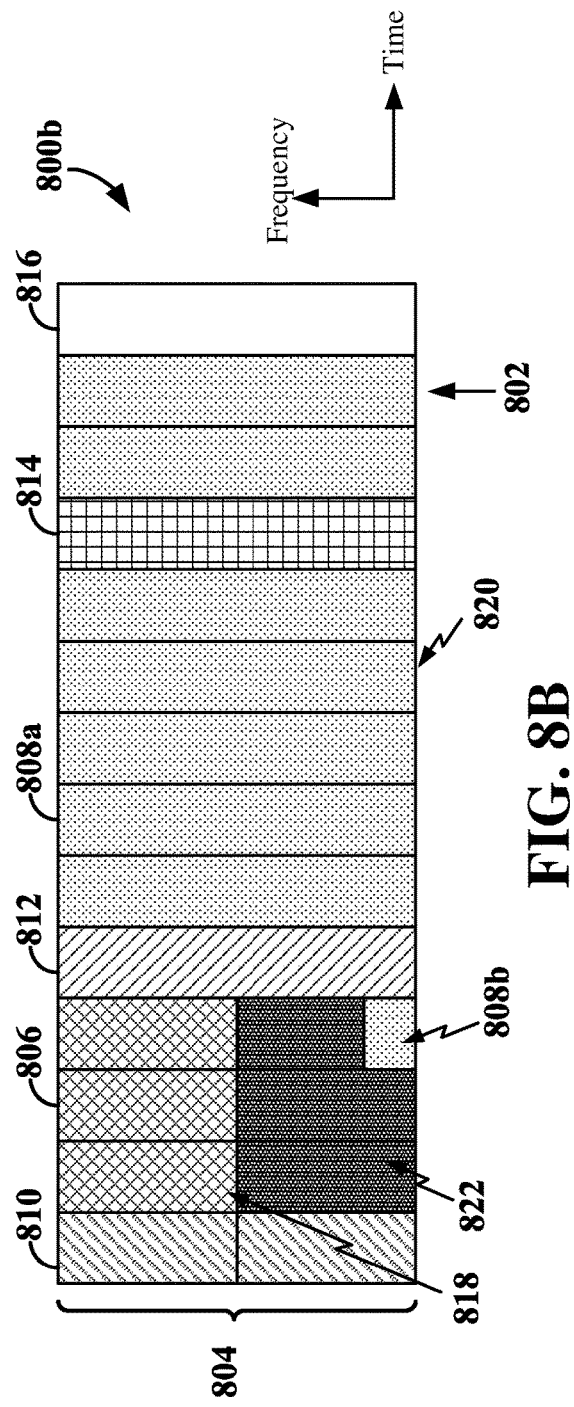
FIG. 8A
FIG. 8B

THIRD STAGE SIDELINK CONTROL INFORMATION DESIGN

CROSS-REFERENCE TO RELATED APPLICATION(S)

This application is the U.S. national stage of PCT patent application number PCT/CN2020/106741 filed on Aug. 4, 2020.

TECHNICAL FIELD

The technology discussed below relates generally to wireless communication networks, and more particularly, to design and configuration of sidelink control information.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

One example of a sidelink wireless communication network is a vehicle-to-everything (V2X) communication network. V2X communication involves the exchange of information not only between vehicles themselves, but also between vehicles and external systems, such as streetlights, buildings, pedestrians, and cellular communication networks. In New Radio (NR) V2X, there are two resource allocation modes for NR sidelink (PC5) communication. In a first mode (Mode 1), the base station may allocate resources for sidelink communication. In a second mode (Mode 2), a sidelink device (e.g., a UE, such as a vehicle UE (V-UE), a pedestrian UE (P-UE), a roadside unit (RSU), etc.) may autonomously select sidelink resources and schedule sidelink communication using sidelink control information (SCI).

In some examples, SCI may include two SCI stages. Stage 1 sidelink control information (first stage SCI) may be referred to herein as SCI-1. Stage 2 sidelink control information (second stage SCI) may be referred to herein as SCI-2. SCI-1 may be transmitted on a physical sidelink control channel (PSCCH). SCI-1 may include information for resource allocation of a sidelink resource and for decoding of the second stage of sidelink control information (i.e., SCI-2).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of sidelink wireless communication at a user equipment (UE) is disclosed. The method includes transmitting first stage sidelink control information (SCI) over a sidelink channel within a control region of a slot, transmitting second stage SCI within a data region of the slot, and transmitting third stage SCI within the data region of the slot. The second stage SCI can include a first indication indicating that the third stage SCI is included in the slot and a second indication indicating a format of the third stage SCI.

Another example provides a wireless apparatus in a sidelink wireless communication network. The wireless apparatus includes a wireless transceiver configured to communicate over a sidelink channel, a memory, and a processor communicatively coupled to the wireless transceiver and the memory. The processor and the memory may be configured to transmit first stage sidelink control information (SCI) over the sidelink channel within a control region of a slot, transmit second stage SCI within a data region of the slot, and transmit third stage SCI within the data region of the slot. The second stage SCI can include a first indication indicating that the third stage SCI is included in the slot and a second indication indicating a format of the third stage SCI.

Another example provides a wireless apparatus in a sidelink wireless communication network. The wireless apparatus includes means for transmitting first stage sidelink control information (SCI) over a sidelink channel within a control region of a slot, means for transmitting second stage SCI within a data region of the slot, and means for transmitting third stage SCI within the data region of the slot. The second stage SCI can include a first indication indicating that the third stage SCI is included in the slot and a second indication indicating a format of the third stage SCI.

Another example provides a non-transitory computer-readable medium having stored therein instructions executable by one or more processors of a user equipment (UE) in a sidelink wireless communication network to transmit first stage sidelink control information (SCI) over the sidelink channel within a control region of a slot, transmit second stage SCI within a data region of the slot, and transmit third stage SCI within the data region of the slot. The second stage SCI can include a first indication indicating that the third stage SCI is included in the slot and a second indication indicating a format of the third stage SCI.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIGS. 5A and 5B are diagrams illustrating examples of sidelink slot structures according to some aspects.

FIGS. 8A and 8B are diagrams illustrating examples of sidelink slot structures implementing rate-matching of third stage sidelink control information according to some aspects.

DETAILED DESCRIPTION

Figure 1:
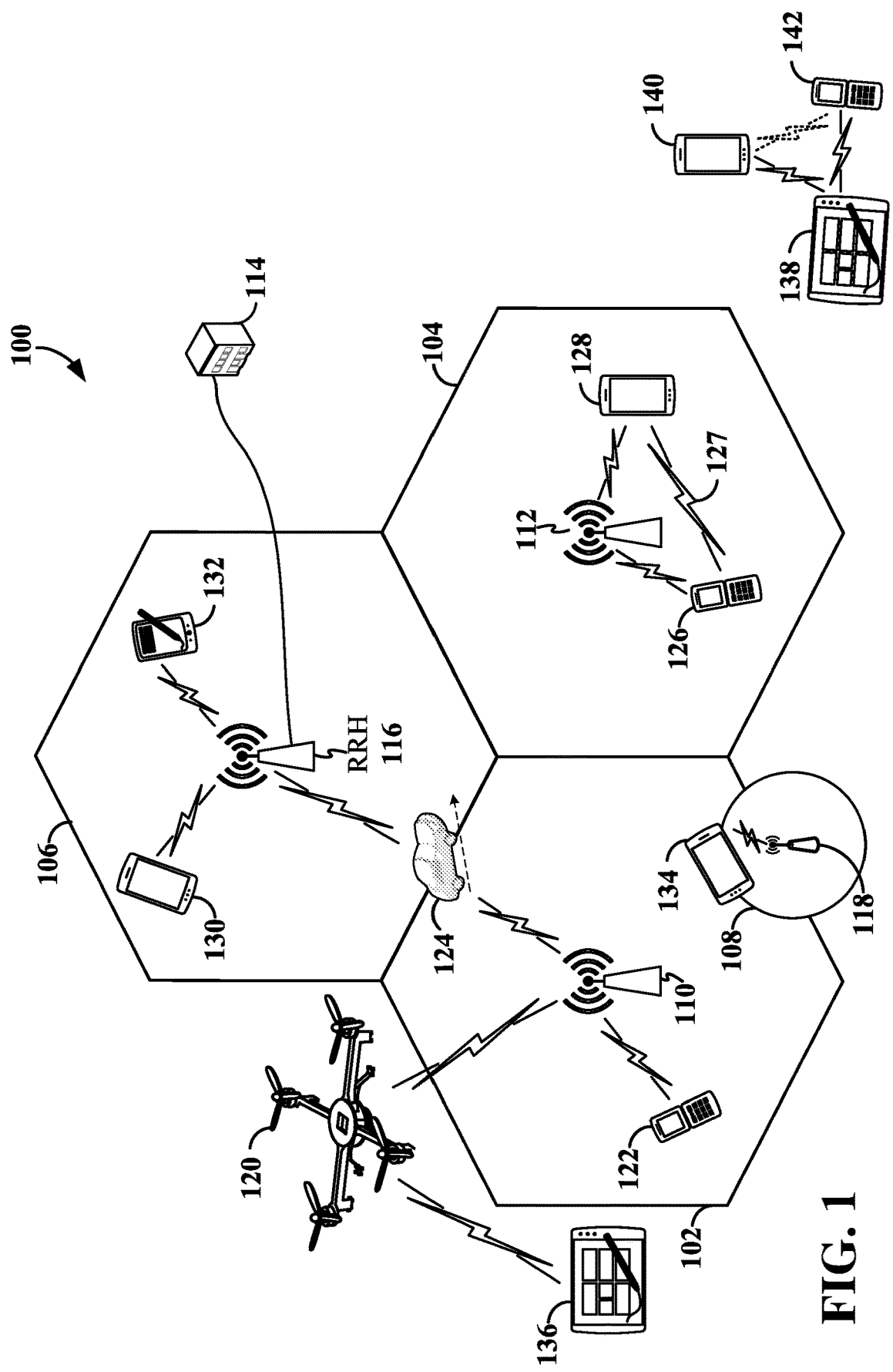
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to mechanisms for a wireless apparatus (e.g., a UE) to configure and indicate sidelink control information (SCI) for sidelink communication within a slot over a sidelink channel. The SCI can include first stage SCI (SCI-1), second stage SCI (SCI-2), and third stage SCI (SCI-3). The SCI-1 may be transmitted within a control region of the slot, whereas the SCI-2 and the SCI-3 may be transmitted within a data region (e.g., corresponding to a physical sidelink shared channel (PSSCH)) of the slot. The SCI-2 may include information for decoding SCI-3, including, for example, a resource size, modulation order, and rate-matching behavior of the SCI-3. The sidelink communication can further include sidelink data traffic that may be communicated in the data region of the slot.

In some examples, the SCI-3 may be unicast, broadcast, or groupcast. The SCI-3 may further be intended for the same set of one or more destination UEs as the SCI-2 or a different set of destination UEs. In examples in which both SCI-2 and SCI-3 are intended for the same set of destination UEs, the SCI-3 may use the intended recipient information (e.g., one or more destination IDs or a group ID for groupcast communication) of the SCI-2. In examples in which SCI-2 and SCI-3 are intended for different sets of destination UEs, SCI-2 may include the intended recipient information for SCI-3 or may indicate the SCI type (e.g., unicast or groupcast) of SCI-3. In the latter example, SCI-3 may include the intended recipient information for SCI-3.

In some examples, the SCI-3 may follow the rate-matching behavior of SCI-2 or the PSSCH. In addition, for PSSCH transmissions that span two layers, the SCI-3 may either be rate-matched into both layers or may follow the rate-matching behavior of SCI-2. In some examples, a code rate scaling factor may be selected for the SCI-3 to determine the resource size of the SCI-3. The code rate scaling factor may be, for example, between one and the code rate scaling factor of the SCI-2. In addition, a modulation order may be selected for the SCI-3. The modulation order may be between the respective modulation orders of the SCI-2 and the sidelink data traffic.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a transmitting sidelink device, and UEs 140 and 142 may function as a scheduled entity or a receiving sidelink device. For example, UE 138 may function as a scheduling entity in a device-to-device (D2D), peer-to-peer (P2P), vehicle-to-everything (V2X), and/or in a mesh network. In a mesh network example, UEs 140 and 142 may optionally communicate directly with one another in addition to communicating with the scheduling entity 138.

In some aspects of the present disclosure, two or more UEs (e.g., UEs 126 and 128) within the coverage area of a serving base station 112 may communicate with each other using sidelink signals 127 without relaying that communication through the base station. In this example, the base station 127 or one or both of the UEs 126 and 128 may function as scheduling entities to schedule sidelink communication between UEs 126 and 128. For example, UEs 126 and 128 may communicate sidelink signals 127 within a vehicle-to-everything (V2X) network.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
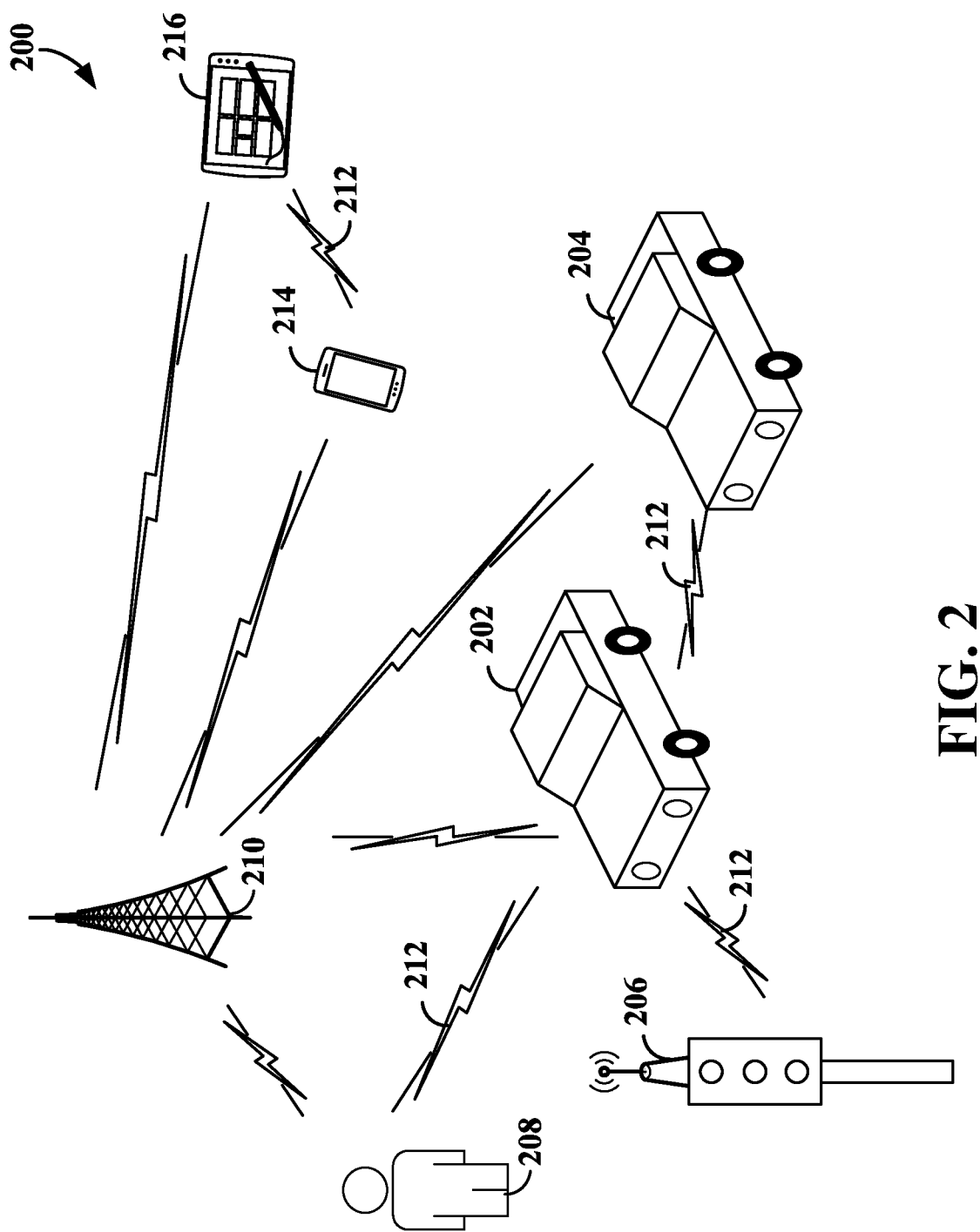
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 occurs over a proximity service (ProSe) PC5 interface 212. In various aspects of the disclosure, the PC5 interface 212 may further be utilized to support D2D communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

Figure 3:
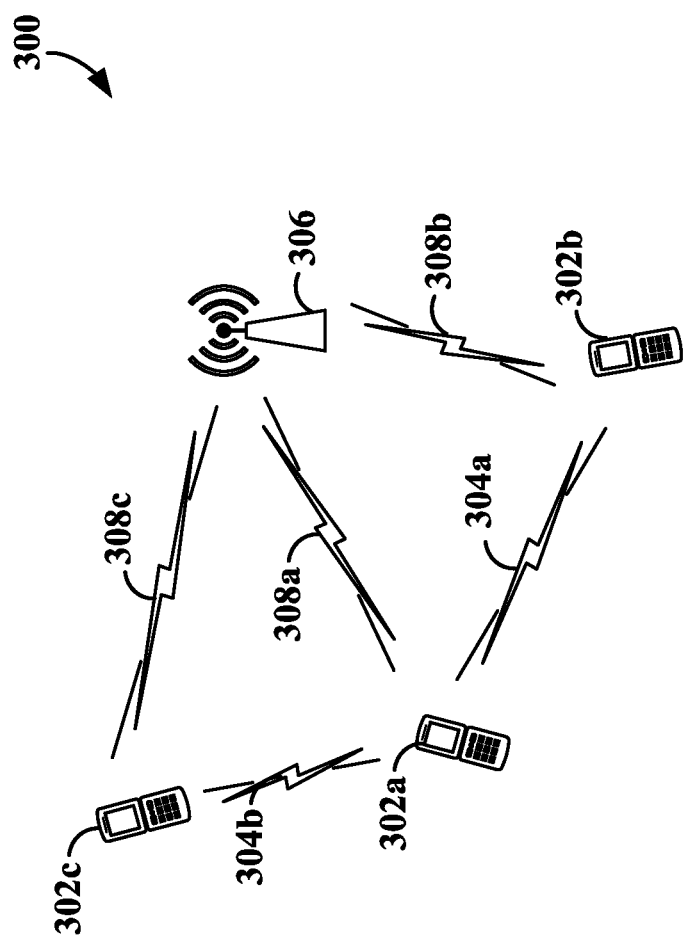
FIG. 3 is a diagram illustrating an example of a wireless communication system for facilitating both cellular and sidelink communication according to some aspects.

FIG. 3 is a diagram illustrating an example of a wireless communication system 300 for facilitating both cellular and sidelink communication. The wireless communication system 300 includes a plurality of UEs 302*a*, 302*b*, and 302*c* and a base station (e.g., eNB or gNB) 306. In some examples, the UEs 302a, 302b, and 302c may be UEs capable of implementing D2D or V2X devices (e.g., RSUs, V-UEs, P-UEs, etc.) within a V2X network.

The UEs 302a and 302b may communicate over a first PC5 interface 304a, while UEs 302a and 302c may communicate over a second PC5 interface 304b. UEs 302a, 302b, and 302c may further communicate with the base station 306 over respective Uu interfaces 308a, 308b, and 308c. The sidelink communication over the PC5 interfaces 304a and 304b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the PC5 interfaces 304a and 304b and Uu interfaces 308a-308c, such that resources on the common carrier may be allocated for both sidelink communication between UEs 302a-302c and cellular communication (e.g., uplink and downlink communication) between the UEs 302a-302c and the base station 306. For example, the wireless communication system 300 may be configured to support a V2X network in which resources for both sidelink and cellular communication are scheduled by the base station 306. In other examples, the UEs 302a-302c may autonomously select sidelink resources (e.g., from one or more frequency bands or sub-bands designated for sidelink communication) for communication therebetween. In this example, the UEs 302a-302c may function as both scheduling entities and scheduled entities scheduling sidelink resources for communication with each other.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
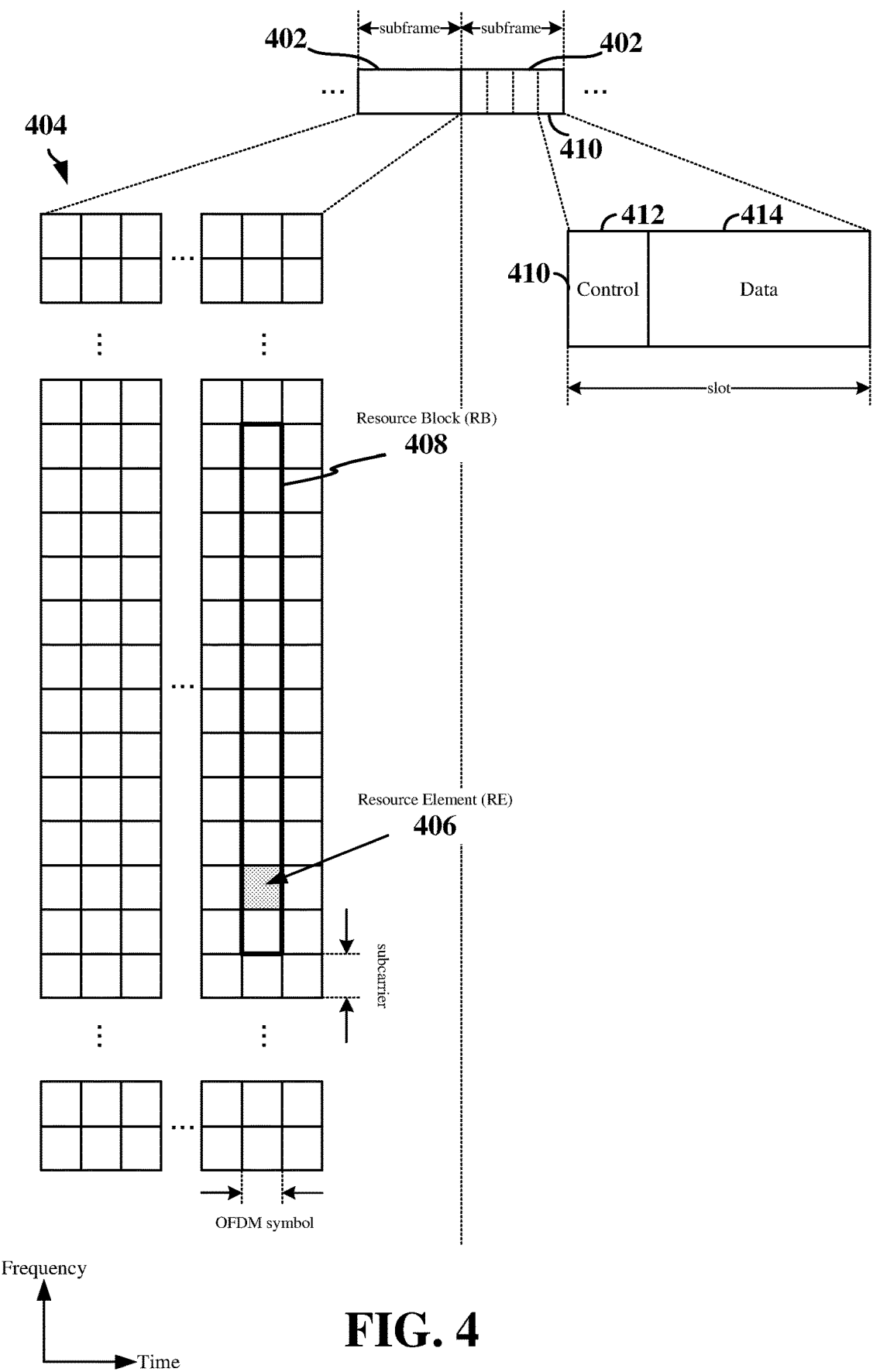
FIG. 4 is a diagram illustrating an example of a frame structure for use in a wireless communication network according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 406 within one or more sub-bands. Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device)

to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB and/or a sidelink CSI-RS, may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

In 5G NR (e.g., V2X), sidelink communication may utilize transmission or reception resource pools. For example, the minimum resource allocation unit in frequency may be a sub-channel (e.g., which may include, for example, 10, 15, 20, 25, 50, 75, or 100 consecutive RBs) and the minimum resource allocation unit in time may be one slot. A radio resource control (RRC) configuration of the resource pools may be either pre-configured (e.g., pre-loaded on the UE) or configured by the base station (e.g., gNB).

In addition, there may be two main resource allocation modes of operation for sidelink (e.g., PC5) communications. In a first mode, Mode 1, a radio access network (RAN) node (e.g., gNB) may allocate resources to UEs for sidelink communication between the UEs in various manners. For example, the RAN node may allocate sidelink resources dynamically (e.g., a dynamic grant) to UEs, in response to requests for sidelink resources from the UEs. The RAN node may further activate preconfigured sidelink grants (e.g., configured grants) for sidelink communication among the UEs. In Mode 1, sidelink feedback may be reported back to the RAN node by a transmitting UE.

In a second mode, Mode 2, the UEs may autonomously select sidelink resources for sidelink communication therebetween. In some examples, a transmitting UE may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

FIGS. 5A and 5B are diagrams illustrating examples of sidelink slot structures according to some aspects. The sidelink slot structures may be utilized, for example, in a V2X or other D2D network implementing sidelink In the examples shown in FIGS. 5A and 5B, time is in the horizontal direction with units of symbols 502 (e.g., OFDM symbols); and frequency is in the vertical direction. Here, a carrier bandwidth 504 allocated for sidelink wireless communication is illustrated along the frequency axis. The carrier bandwidth 504 may include a plurality sub-channels, where each sub-channel may include a configurable number of PRBs (e.g., 10, 15, 20, 25, 50, 55, or 100 PRBs).

Each of FIGS. 5A and 5B illustrate an example of a respective slot 500a or 500b including fourteen symbols 502 that may be used for sidelink communication. However, it should be understood that sidelink communication can be configured to occupy fewer than fourteen symbols in a slot 500a or 500b, and the disclosure is not limited to any particular number of symbols 502. Each sidelink slot 500a and 500b includes a physical sidelink control channel (PSCCH) 506 occupying a control region 518 of the slot 500a and 500b and a physical sidelink shared channel (PSSCH) 508 occupying a data region 520 of the slot 500a and 500b. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIGS. 5A and 5B, the PSCCH 506 and corresponding PSSCH 508 are transmitted in the same slot 500a and 500b. In other examples, the PSCCH 506 may schedule a PSSCH in a subsequent slot.

In some examples, the PSCCH 506 duration is configured to be two or three symbols. In addition, the PSCCH 506 may be configured to span a configurable number of PRBs, limited to a single sub-channel. For example, the PSCCH 506 may span 10, 12, 15, 20, or 25 PRBs of a single sub-channel. A DMRS may further be present in every PSCCH symbol. In some examples, the DMRS may be placed on every fourth RE of the PSCCH 506. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 5A and 5B, the starting symbol for the PSCCH 506 is the second symbol of the corresponding slot 500a or 500b and the PSCCH 506 spans three symbols 502.

The PSSCH 508 may be time-division multiplexed (TDMed) with the PSCCH 506 and/or frequency-division multiplexed (FDMed) with the PSCCH 506. In the example shown in FIG. 5A, the PSSCH 508 includes a first portion 508a that is TDMed with the PSCCH 506 and a second portion 508b that is FDMed with the PSCCH 506. In the example shown in FIG. 5B, the PSSCH 508 is TDMed with the PSCCH 506.

One and two layer transmissions of the PSSCH 508 may be supported with various modulation orders (e.g., QPSK, 16-QAM, 64-QAM and 256-QAM). In addition, the PSSCH 508 may include DMRSs 514 configured in a two, three, or four symbol DMRS pattern. For example, slot 500a shown in FIG. 5A illustrates a two symbol DMRS pattern, while slot 500b shown in FIG. 5B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500a or 500b. In addition, a gap symbol 516 is present after the PSSCH 508 in each slot 500a and 500b.

Each slot 500a and 500b further includes SCI-2 512 mapped to contiguous RBs in the PSSCH 508 starting from the first symbol containing a PSSCH DMRS. In the example shown in FIG. 5A, the first symbol containing a PSSCH DMRS is the fifth symbol occurring immediately after the last symbol carrying the PSCCH 506. Therefore, the SCI-2 512 is mapped to RBs within the fifth symbol. In the example shown in FIG. 5B, the first symbol containing a PSSCH DMRS is the second symbol, which also includes the PSCCH 506. In addition, the SCI-2/PSSCH DMRS 512 are shown spanning symbols two through five. As a result, the SCI-2/PSSCH DMRS 512 may be FDMed with the PSCCH 506 in symbols two through four and TDMed with the PSCCH 506 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 506 may be blind decoded at the receiving wireless communication device. However, since the format, starting location, and number of REs of the SCI-2 512 may be derived from the SCI-1, blind decoding of SCI-2 is not needed at the receiver (receiving UE).

In each of FIGS. 5A and 5B, the second symbol of each slot 500a and 500b is copied onto (repeated on) a first symbol 510 thereof for automatic gain control (AGC) settling. For example, in FIG. 5A, the second symbol containing the PSCCH 506 FDMed with the PSSCH 508b may be transmitted on both the first symbol and the second symbol. In the example shown in FIG. 5B, the second symbol containing the PSCCH 506 FDMed with the SCI-2/PSSCH DMRS 512 may be transmitted on both the first symbol and the second symbol.

In some examples, as discussed above, SCI-1 may use two bits to indicate the format of SCI-2. As a result, four different SCI-2 formats may be supported. In some scenarios, different or more flexible SCI formats may be desired. Therefore, in various aspects of the disclosure, the SCI may further include a stage three SCI (third stage SCI), referred to herein as SCI-3, to support flexible SCI formats and lengths. The SCI-3 may include additional control information on top of the control information included in the SCI-1 and the SCI-2. The SCI-3 may be unicast, groupcast, or broadcast. In addition, the SCI-3 may be transmitted, together with the SCI-2, within the data region of a slot.

In some examples, the SCI-2 may include additional content related to SCI-3. For example, the SCI-2 may indicate whether SCI-3 is present in the slot, and if so, indicate the format of the SCI-3 to enable decoding thereof. The format may indicate, for example, the modulation order (e.g., QPSK, 16-QAM, 64-QAM and 256-QAM) and rate-matching behavior of the SCI-3. The format may further indicate the number of REs of the SCI-3 (e.g., the resource size of the SCI-3). In some examples, the SCI-2 may further indicate whether PSSCH is present in the slot. If not, the slot may include only SCI-1, SCI-2, and SCI-3.

Figure 6:
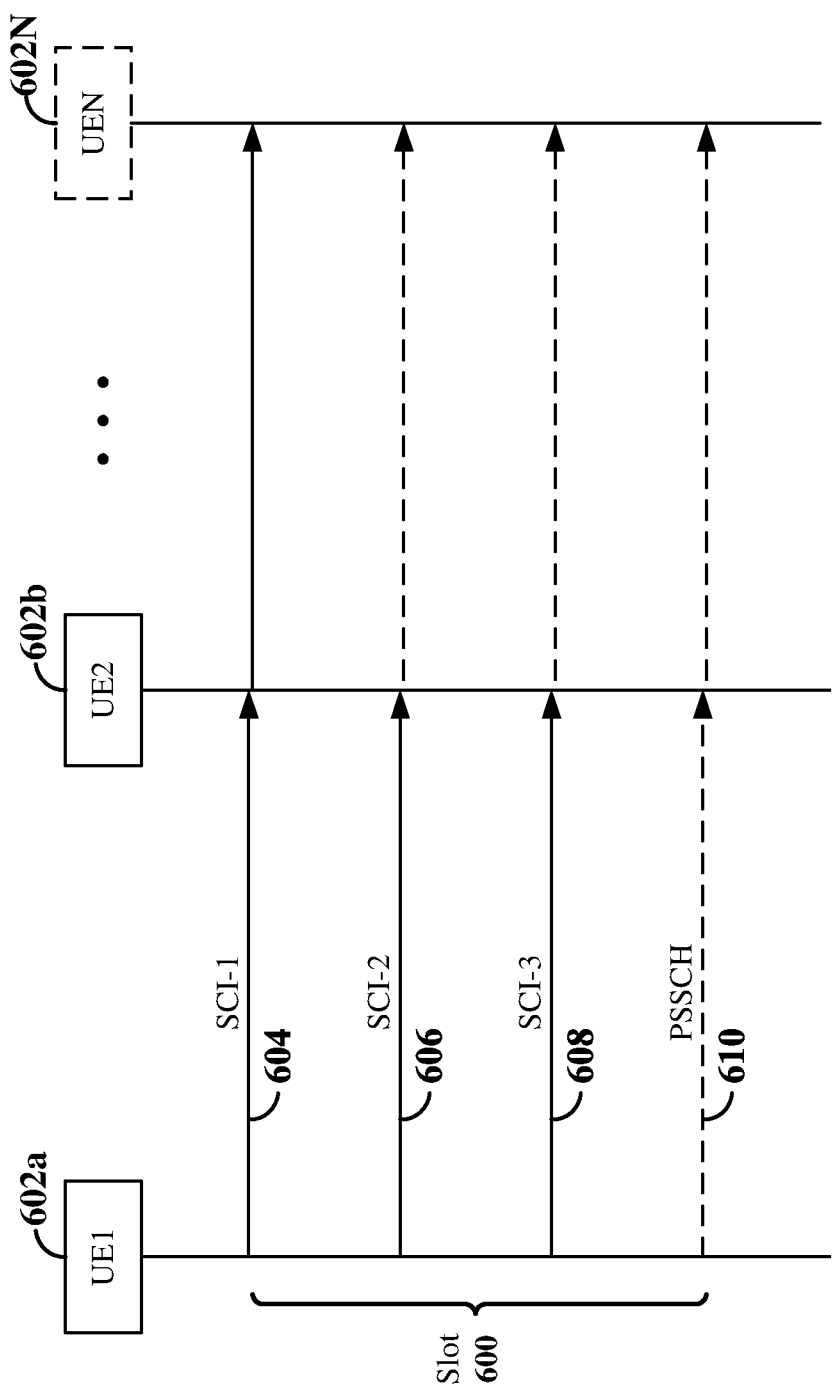
FIG. 6 is a signaling diagram illustrating an example of communication of sidelink control information including three stages according to some aspects.

FIG. 6 is a signaling diagram illustrating an example of communication of sidelink control information including three stages according to some aspects. In the example shown in FIG. 6, a first UE (e.g., UE1) 602a is in wireless communication with one or more other UEs (e.g., UE2 602b . . . UEN 602N) over a sidelink channel. Each UE 602a, 602b, . . . , 602N may correspond to any of the scheduled entities, UEs, V2X devices, or D2D devices shown in FIGS. 1-3.

At 604, the UE1 602a, which may be a transmitting UE, broadcasts SCI-1 within a slot 600 on the sidelink channel. The SCI-1 may be used, for example, for channel sensing, and as such, may be decodable by any receiving UE (e.g., UE2 602b, . . . UEN 602N). For example, each receiving UE 602b . . . 602N may blind decode the SCI-1. The SCI-1 may include, for example, a resource allocation on a sidelink carrier for sidelink data traffic (PSSCH) and a resource allocation of the second stage SCI (SCI-2). The resource allocation for the sidelink data traffic may be within the same slot 600 or a subsequent slot.

At 606, the UE1 602a further transmits the SCI-2 within the same slot 600. In some examples, SCI-2 may be unicast to a single UE (e.g., UE2 602b) or groupcast or broadcast to multiple UEs (e.g., UE2 602b . . . UEN 602N). The SCI-1 may be transmitted, for example, within a PSCCH, whereas SCI-2 may be transmitted within the PSSCH. The SCI-2 may contain further information related to the sidelink data traffic, such as the source ID and destination IDs (or group ID for groupcast PSSCH), and a resource allocation for the SCI-3. For example, SCI-2 may include the format of the SCI-3 to enable decoding thereof. The format may indicate, for example, the modulation order and rate-matching behavior of the SCI-3. The format may further indicate the number of REs (e.g., resource size) of the SCI-3. In some examples, the SCI-2 may further indicate whether PSSCH is present in the slot. If not, the slot may include only SCI-1, SCI-2, and SCI-3.

At 608, the UE1 602a transmits the SCI-3 within the same slot 600. In some examples, SCI-3 may be unicast to a single UE (e.g., UE2 602b) or groupcast or broadcast to multiple UEs (e.g., UE2 602b . . . UEN 602N). In some examples, for unicast SCI-3, the SCI-3 may share the same destination ID as SCI-2 (e.g., the destination ID of UE2 602b). In this example, SCI-2 and SCI-3 are both unicast and intended for the same UE (e.g., UE2 602b). In other examples, the unicast SCI-3 may have a different destination ID than the SCI-2. In this example, SCI-2 may be unicast, groupcast, or broadcast. In some examples, SCI-3 may include one of the destination IDs associated with the groupcast or broadcast SCI-2. Thus, SCI-3 may serve a subset of the destination IDs associated with SCI-2. In one example, when SCI-2 and SCI-3 include different destination IDs, SCI-2 may further include the destination ID for SCI-3. Thus, SCI-2 may specify the receiving device (e.g., UEN 602b) that needs to decode SCI-3. In another example, for groupcast or broadcast SCI-2 in which SCI-3 serves a subset of the destination IDs associated with SCI-2, SCI-2 may indicate that SCI-3 is unicast, but the destination ID for SCI-3 may be included in SCI-3.

For groupcast SCI-3, in some examples, the SCI-3 may share the same group ID as SCI-2. In this example, SCI-2 and SCI-3 are both groupcast and intended for the same group of destination UEs (e.g., UE2 602b . . . UEN 602N). In addition, SCI-3 may further utilize the zone identifier and a maximum communication range for NACK included in SCI-2. In other examples, the groupcast SCI-3 may serve a different group than SCI-2. In this example, SCI-2 may be groupcast or broadcast. In some examples, SCI-3 may serve a subset of the receiving UEs of SCI-2 (e.g., the SCI-3 may serve a subset of the destination IDs associated with SCI-2). In one example, when SCI-2 and SCI-3 serve different groups, SCI-2 may further include the group ID for SCI-3. In this example, SCI-2 may include the group ID for SCI-2 and the group ID for SCI-3. In another example, when SCI-3 serves a subset of the UEs served by SCI-2, SCI-2 may indicate that SCI-3 is groupcast, but the group ID for SCI-3 may be included in SCI-3.

At 610, the UE1 602a may further optionally transmit sidelink data traffic (e.g., a PSSCH) within the slot 600. In some examples, the UE1 602a may indicate whether the sidelink data traffic is included in the slot within the SCI-2. In examples in which SCI-2 indicates that sidelink data traffic is not included in the slot, the UE1 602a may transmit only SCI-1, SCI-2, and SCI-3 within the slot.

Figure 7:
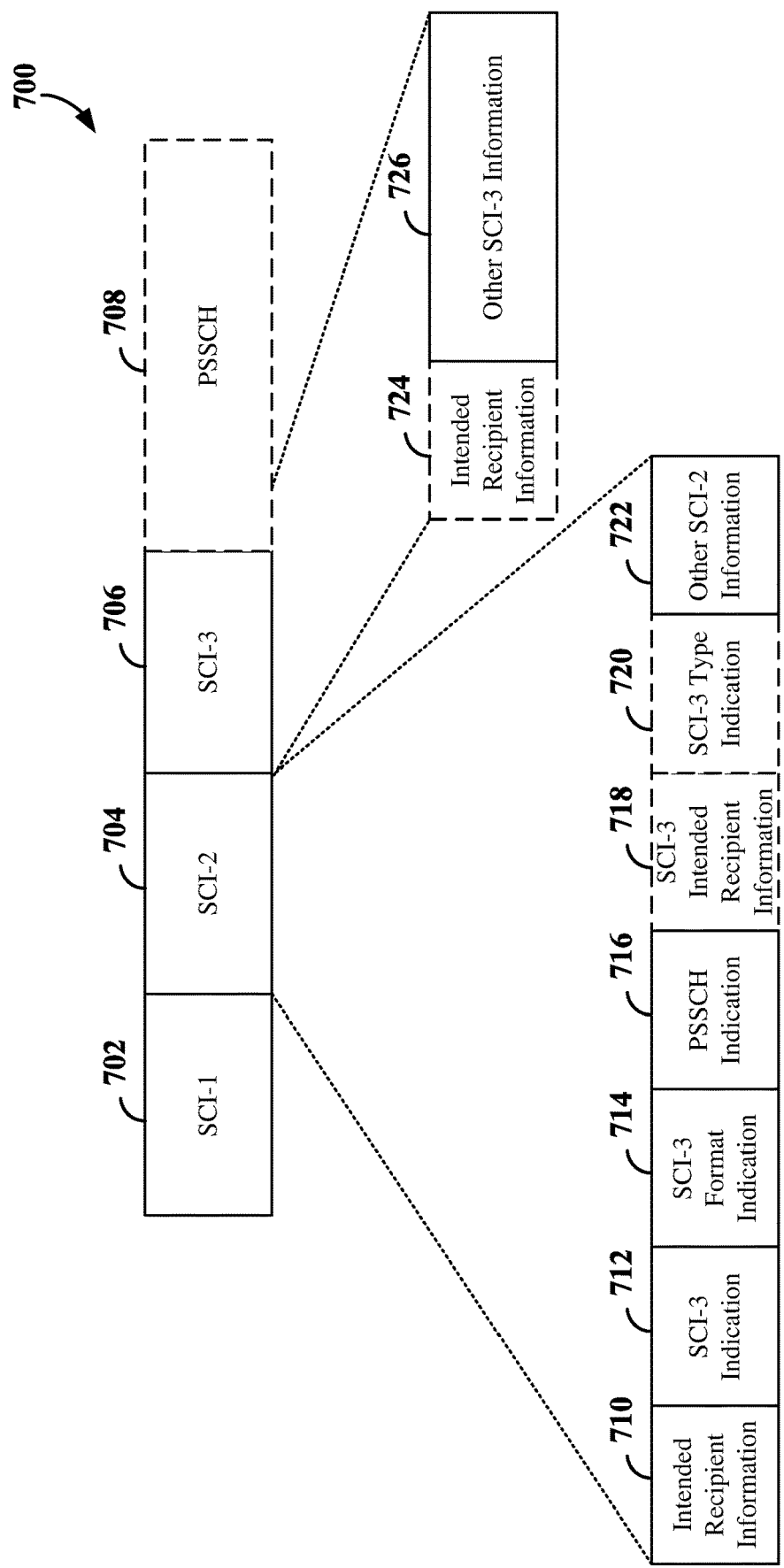
FIG. 7 is a diagram illustrating an example of a slot carrying sidelink control information including three stages according to some aspects.

FIG. 7 is a diagram illustrating an example of a slot 700 carrying sidelink control information including three stages according to some aspects. The slot 700 includes first stage SCI 702 (SCI-1), second stage SCI (SCI-2) 704, and third stage SCI (SCI-3) 706. The slot 700 may further optionally include a PSSCH 708 carrying sidelink data traffic.

The SCI-1 702, as described above, may include various control information, including, for example, a resource allocation for the PSSCH 708 and a resource allocation of the SCI-2 704. The SCI-2 704 may include, for example, intended recipient information 710 (e.g., a destination ID for unicast SCI-2, group ID for groupcast SCI-2, or broadcast indicator for broadcast SCI-2). Thus, the intended recipient information 710 identifies a first set of one or more destination UEs intended to receive the SCI-2 704. The SCI-2 704 may further include an SCI-3 indication 712 indicating whether the slot contains SCI-3 706.

In examples in which the slot 700 contains SCI-3 706, as shown in FIG. 7, the SCI-2 704 may further include an SCI-3 format indication 714 indicating a format of the SCI-3 706. The SCI-3 format indication 714 may indicate, for example, the number of REs (e.g., resource size) of the SCI-3. The SCI-3 format indication 714 may further indicate, for example, a modulation order and rate-matching behavior of the SCI-3 706. In some examples, a modulation order of the SCI-3 706 may be between the modulation order of the SCI-2 704 and the modulation order of the PSSCH 708. For example, for broadcast or groupcast SCI-3, the modulation order of the SCI-3 706 may be the same as the modulation order of the SCI-2 704. In addition, for unicast SCI-3, the modulation order of the SCI-3 706 may be the same as the modulation order of the SCI-2 to provide better performance. In some examples, the modulation order of SCI-2 704 may include QPSK to cover all of the destination UEs. In other examples, for unicast SCI-3, the modulation order of the SCI-3 706 may be the same as the modulation order of the PSSCH 708. In still other examples, for unicast SCI-3, the modulation order of the SCI-3 706 may be greater than the modulation order of the SCI-2 704, but less than the modulation order of the PSSCH 708 to provide improved performance relative to the PSSCH 708 (though the performance relative to the SCI-2 704 may be less since the SCI-3 is unicast).

The rate-matching behavior may indicate, for example, whether the SCI-3 706 follows the rate-matching behavior of the SCI-2 704 or the rate-matching behavior of the PSSCH 708. For example, when the SCI-3 706 follows the rate-matching behavior of the SCI-2 704, the SCI-3 706 may begin rate-matching after the SCI-2 704. In this example, the slot 700 includes the PSSCH 708. In examples in which the SCI-3 706 follows the rate-matching behavior of the PSSCH 708, the SCI-3 706 may begin rate-matching from the first symbol and rate-match around the SCI-1 702 and the SCI-2 704. For a two-layer PSSCH transmission, the SCI-3 706 may rate-match into both layers (e.g., use resources in both layers to perform rate-matching) or may follow the SCI-2 rate-matching behavior. For example, the SCI-2 704 may be repeated in the second layer, and the SCI-3 706 may be similarly repeated in the second layer.

For rate-matching of the SCI-3 706 within the PSSCH 708 (e.g., within the data region of the slot), a code rate scaling factor $\beta_{offset}$ may be selected and used to determine the resource size (e.g., the number of REs per layer) for the SCI-3 706. For example, the number of REs per layer for the SCI-3 ($N_{RE,SCI-3}$) may be calculated as:

$$N_{RE,SCI-3} = \frac{K_{SCI} \times \beta_{offset}}{K_{SL-SCH}} N_{RE}, \qquad \text{(Equation 1)}$$

where $N_{RE}$ is the total number of REs per layer of the PSSCH, $K_{SL-SCH}$ is the payload size of the sidelink shared channel (e.g., sidelink data traffic) including any transport block or code block cyclic redundancy check (CRC) bits, and $K_{SCI}$ is the payload size of the SCI-3 including any CRC bits. For unicast SCI-3, the code rate scaling factor may be selected to be the same code rate scaling factor used for the SCI-2 704 to provide better performance, may be selected to be equal to one (e.g., the same as the PSSCH) to save resources, or may be selected to be less than the code rate scaling factor of the SCI-2 704 but greater than one to provide better performance than the PSSCH 708 (though the performance relative to the SCI-2 704 may be less since the SCI-3 is unicast). For broadcast or groupcast SCI-3, the code rate scaling factor may be selected to be the same as the SCI-2 704 to provide better performance or may be selected to be less than that of the SCI-2 704 but greater than one. The code rate scaling factor may be selected to be less than SCI-2 and greater than one, for example, when the SCI-2 704 is targeted for all UEs (e.g., broadcast), while the SCI-3 706 targeted for some of the UEs (e.g., groupcast).

The SCI-2 704 may further include a PSSCH indication 708 indicating whether a PSSCH 708 (sidelink data traffic) is included in the slot 700. In examples in which the PSSCH indication 708 indicates that a PSSCH 708 is not included in the slot 700, the slot 700 may exclude the PSSCH 708 and include only the SCI-1 702, the SCI-2 704, and the SCI-3 706.

In some examples, the SCI-2 704 and the SCI-3 706 are associated with different intended recipient information (e.g., different destination IDs or different group IDs). In one example, the SCI-2 704 may further include optional SCI-3 intended recipient information 718 that includes the destination ID or group ID for the SCI-3 706. Thus, the SCI-3 intended recipient information 718 identifies a second set of one or more destination UEs intended to receive the SCI-3 706. In another example, when the SCI-3 706 is intended for a subset of the UEs that receive the SCI-2 704 (e.g., the second set of one or more destination UEs includes a subset of the first set of one or more destination UEs), the SCI-2 704 may further include an optional SCI-3 Type indication 720 indicating that SCI-3 is unicast or groupcast, but the destination ID or group ID for the SCI-3 706 may be included in the SCI-3 706. The SCI-2 704 may further include other SCI-2 information 722. The other SCI-2 information 722 may include, for example, the source ID of the transmitting UE, the destination ID(s) of the receiving (destination) UEs of the PSSCH 708, a HARQ process ID, a new data indicator (NDI), a redundancy version (RV), a CSI report trigger for unicast communications and/or a zone identifier and a maximum communication range for NACK for groupcast communications.

The SCI-3 706 may include optional intended recipient information 724 including the destination ID or group ID for the SCI-3. For example, the intended recipient information may identify the second set of destination UEs intended to receive the SCI-3 706. In examples in which the SCI-3 706 is intended to be received by the same set of destination UEs (e.g., the first set of destination UEs), the SCI-3 706 may not include the intended recipient information 724. In addition, in examples in which the SCI-3 intended recipient information 718 is included in the SCI-2 704, the SCI-3 706 may not include the intended recipient information 724. The SCI-3 706 may further include other SCI-3 information 726 including additional control information.

FIGS. 8A and 8B are diagrams illustrating examples of sidelink slot structures according to some aspects. The sidelink slot structures may be utilized, for example, in a V2X or other D2D network implementing sidelink In the examples shown in FIGS. 8A and 8B, time is in the horizontal direction with units of symbols 802 (e.g., OFDM symbols); and frequency is in the vertical direction. Here, a carrier bandwidth 804 allocated for sidelink wireless communication is illustrated along the frequency axis. The carrier bandwidth 804 may include a plurality of subchannels, where each sub-channel may include a configurable number of PRBs (e.g., 10, 18, 20, 28, 80, 88, or 100 PRBs).

Each of FIGS. 8A and 8B illustrate an example of a respective slot 800a or 800b including fourteen symbols 802 that may be used for sidelink communication. However, it should be understood that sidelink communication can be configured to occupy fewer than fourteen symbols in a slot 800a or 800b, and the disclosure is not limited to any particular number of symbols 802. Each sidelink slot 800a and 800b includes a physical sidelink control channel (PSCCH) 806 occupying a control region 818 of the slot 800a and 800b and a physical sidelink shared channel (PSSCH) 808 occupying a data region 820 of the slot 800a and 800b. The PSCCH 806 and PSSCH 808 are each transmitted on one or more symbols 802 of the slot 800a. The PSCCH 806 includes, for example, SCI-1 that schedules transmission of data traffic on time-frequency resources of the corresponding PSSCH 808. As shown in FIGS. 8A and 8B, the PSCCH 806 and corresponding PSSCH 808 are transmitted in the same slot 800a and 800b. In other examples, the PSCCH 806 may schedule a PSSCH in a subsequent slot.

In some examples, the PSCCH 806 duration is configured to be two or three symbols. In addition, the PSCCH 806 may be configured to span a configurable number of PRBs, limited to a single sub-channel. For example, the PSCCH 806 may span 10, 12, 18, 20, or 28 PRBs of a single sub-channel. A DMRS may further be present in every PSCCH symbol. In some examples, the DMRS may be placed on every fourth RE of the PSCCH 806. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 8A and 8B, the starting symbol for the PSCCH 806 is the second symbol of the corresponding slot 800a or 800b and the PSCCH 806 spans three symbols 802.

The PSSCH 808 may be time-division multiplexed (TDMed) with the PSCCH 806 and/or frequency-division multiplexed (FDMed) with the PSCCH 806. In the examples shown in FIGS. 8A and 8B, the PSSCH 808 includes a first portion 808a that is TDMed with the PSCCH 806 and a second portion 808b that is FDMed with the PSCCH 806.

One and two layer transmissions of the PSSCH 808 may be supported with various modulation orders (e.g., QPSK, 16-QAM, 64-QAM and 256-QAM). In addition, the PSSCH 808 may include DMRSs 814 configured in a two, three, or four symbol DMRS pattern. For example, slots 800a and 800b each illustrate a two symbol DMRS pattern, similar to that shown in FIG. 5A above. In some examples, the transmitting UE can select the DMRS pattern and indicate the selected DMRS pattern in SCI-1, according to channel conditions. The DMRS pattern may be selected, for example, based on the number of PSSCH 808 symbols in the slot 800a or 800b. In addition, a gap symbol 816 is present after the PSSCH 808 in each slot 800a and 800b.

Each slot 800a and 800b further includes SCI-2 812 mapped to contiguous RBs in the PSSCH 808 starting from the first symbol containing a PSSCH DMRS. In the examples shown in FIGS. 8A and 8B, the first symbol containing a PSSCH DMRS is the fifth symbol occurring immediately after the last symbol carrying the PSCCH 806. Therefore, the SCI-2 812 is mapped to RBs within the fifth symbol. The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 806 may be blind decoded at the receiving wireless communication device. However, since the format, starting location, and number of REs of the SCI-2 812 may be derived from the SCI-1, blind decoding of SCI-2 is not needed at the receiver (receiving UE).

Each slot 800a and 800b further includes SCI-3 822 mapped to contiguous RBs in the PSSCH 808. Depending on the rate-matching behavior applied to SCI-3, the SCI-3 822 may follow the rate-matching behavior of the SCI-2 812, as shown in FIG. 8A, or the SCI-3 822 may follow the rate-matching behavior of the PSSCH 808, as shown in FIG. 8B. For example, the SCI-3 822 may start after the first symbol containing a PSSCH DMRS. In the example shown in FIG. 8A, the first symbol containing a PSSCH DMRS is the fifth symbol occurring immediately after the last symbol carrying the PSCCH 806. Therefore, the SCI-3 822 is mapped to RBs starting at the sixth symbol (e.g., the symbol immediately after the symbol containing the first PSSCH DMRS). As another example, the SCI-3 822 may start from the first symbol containing a PSCCH/PSSCH resource if the DMRS symbol is not at the beginning of the PSSCH. In the example shown in FIG. 8B, the first symbol containing a PSCCH/PSSCH resource is the second symbol in the slot. Therefore, the SCI-3 822 is mapped to RBs starting at the second symbol, FMDed with the PSCCH 806 in symbols two through four, and further FDMed with the PSSCH 808b in symbol four.

In each of FIGS. 8A and 8B, the second symbol of each slot 800a and 800b is copied onto (repeated on) a first symbol 810 thereof for automatic gain control (AGC) settling. For example, in FIG. 8A, the second symbol containing the PSCCH 806 FDMed with the PSSCH 808b may be transmitted on both the first symbol and the second symbol. In the example shown in FIG. 8B, the second symbol containing the PSCCH 806 FDMed with the SCI-3 822 may be transmitted on both the first symbol and the second symbol.

Figure 9:
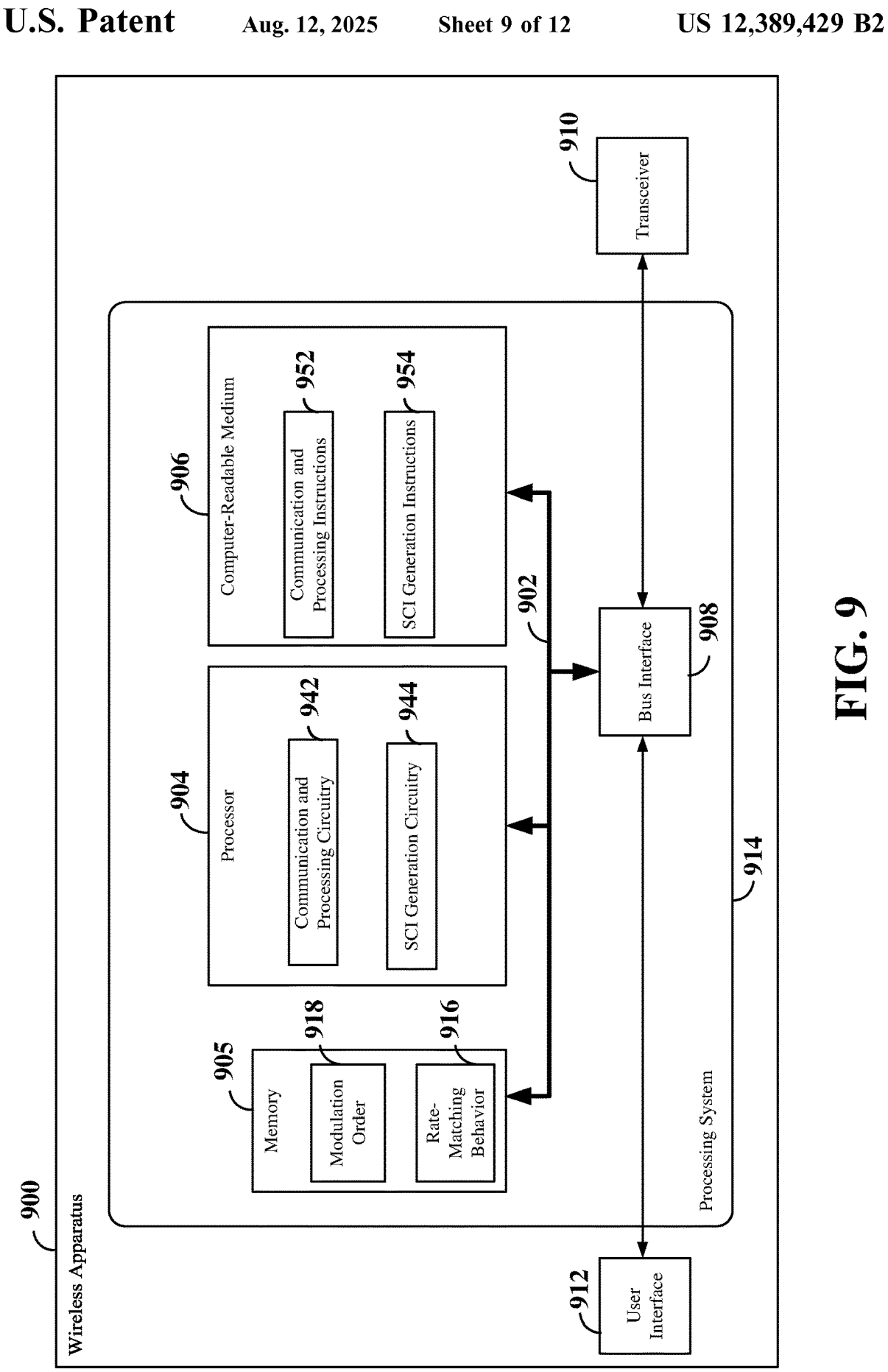
FIG. 9 is a block diagram illustrating an example of a hardware implementation for a wireless apparatus employing a processing system according to some aspects.

FIG. 9 is a block diagram illustrating an example of a hardware implementation for a wireless apparatus 900 employing a processing system 914. For example, the wireless apparatus 900 may correspond to a sidelink device, such as a V2X device, D2D device or other UE or wireless apparatus configured for sidelink communication, as shown and described above in reference to FIGS. 1-3, and/or 6.

The wireless apparatus 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless apparatus 900 may be configured to perform any one or more of the functions described herein. That is, the processor 904, as utilized in the wireless apparatus 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a transceiver 910. The transceiver 910 provides a means for communicating with various other apparatus over a transmission medium (e.g., air interface). Depending upon the nature of the apparatus, a user interface 912 (e.g., keypad, display, touch screen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 904, causes the processing system 914 to perform the various functions described below for any particular apparatus. The computer-readable medium 906 and the memory 905 may also be used for storing data that is manipulated by the processor 904 when executing software.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 942, configured to communicate with one or more other wireless apparatuses (e.g., other UEs) via a sidelink (e.g., PC5) interface. In some examples, the communication and processing circuitry 942 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 942 may be configured to transmit a PSCCH including SCI-1 and a PSSCH including SCI-2, SCI-3, and sidelink data traffic to one or more destination UEs using the transceiver 910. For example, the communication and processing circuitry 942 may be configured to transmit the SCI-1, SCI-2, SCI-3, and optionally the sidelink data traffic, within a sidelink slot. For example, the communication and processing circuitry 942 may be configured to transmit SCI-2 within a PSCCH in a control region of the sidelink slot, and SCI-2 and SCI-3 within a PSSCH in a data region of the sidelink slot. The communication and processing circuitry 942 may further be configured to execute communication and processing software 952 stored in the computer-readable medium 906 to implement one or more of the functions described herein.

The processor 904 may further include SCI generation circuitry 944, configured to generate the SCI-1, SCI-2, and SCI-3 for the sidelink data traffic. In some examples, the SCI generation circuitry 944 may be configured to generate SCI-1 including, for example, a format of the SCI-2 (e.g., the resource size of SCI-2, a number of a PSSCH DMRS port(s), and an MCS index), a priority level (e.g., Quality of Service (QoS)) of the sidelink data traffic, a PSSCH resource assignment and a resource reservation period (if enabled) for the sidelink data traffic, a DMRS pattern (if more than one pattern is configured). The SCI generation circuitry 944 may further be configured to generate SCI-2 including, for example, a source ID and destination ID(s) for the sidelink data traffic, a HARQ process ID, a new data indicator (NDI), a redundancy version (RV), a CSI report trigger for unicast communications, and/or a zone identifier and a maximum communication range for NACK for groupcast communications.

The SCI-2 may further include additional content related to SCI-3. For example, the SCI-2 may indicate whether SCI-3 is present in the slot, and if so, indicate the format of the SCI-3 to enable decoding thereof. The format may indicate, for example, a rate-matching behavior 916 and modulation order 918 of the SCI-3. The format may further indicate the resource size (e.g., number of REs) of the SCI-3. In some examples, the SCI-2 may further indicate whether PSSCH is present in the slot. If not, the slot may include only SCI-1, SCI-2, and SCI-3. The SCI-2 may further include intended recipient information for the SCI-2, and may further include either SCI-3 intended recipient information or an indication of the SCI-3 type (e.g., unicast or groupcast) when the intended recipient information differs between SCI-2 and SCI-3. The SCI generation circuitry 944 may further be configured to generate SCI-3 including additional control information on top of SCI-1 and SCI-2. SCI-3 may support flexible lengths and formats. In addition, SCI-3 may be unicast, groupcast, or broadcast.

The SCI generation circuitry 944 may further be configured to select the rate-matching behavior 916 for the SCI-3. For example, the SCI generation circuitry 944 may select a first code rate scaling factor for the SCI-3 that is between one and a second code rate scaling factor of the SCI-2 to determine a resource size of the SCI-3. The SCI generation may then rate-match the SCI-3 within the data region of the sidelink slot based on the first code rate scaling factor. In some examples, the SCI generation circuitry 944 may be configured to select the first code rate scaling factor to be equivalent to the second code rate scaling factor. In this example, the rate-matching behavior 916 may follow that of SCI-2, and the SCI generation circuitry 944 may be configured to rate-match the SCI-1 from a first symbol following a second symbol carrying the SCI-2. In other examples, the SCI generation circuitry 944 may be configured to select the first code rate scaling factor to be equal to one. In this example, the rate-matching behavior 916 may follow that of the PSSCH, and the SCI generation circuitry 944 may be configured to rate-match the SCI-3 from a first symbol carrying the SCI-1. Here, the SCI generation circuitry 944 may be configured to FDM the SCI-3 with the SCI-1. The rate-matching behavior 916 may further indicate that the SCI generation circuitry 944 can rate-match the SCI-3 in two or more layers or follow the SCI-2 rate-matching for the second layer (e.g., repeat the SCI-3 in the second layer).

The SCI generation circuitry 944 may further be configured to select the modulation order 918 for the SCI-3. For example, the SCI generation circuitry 944 may be configured to select a first modulation order 918 for the SCI-3 that is between a second modulation order of the SCI-2 and a third modulation order of the sidelink data traffic. In some examples, the SCI generation circuitry 944 may select the first modulation order 918 to be equivalent to the second modulation order. In this example, the second modulation order may include QPSK for unicast SCI-2/SCI-3. In other examples, the SCI generation circuitry 944 may select the first modulation order to be equivalent to the PSSCH (sidelink data traffic). In still other examples, the SCI generation circuitry 944 may select the first modulation order to be greater than SCI-2 but less than the PSSCH (sidelink data traffic).

The SCI generation circuitry 944 may further be configured to select the intended recipients for the SCI-3. In some examples, the intended recipient(s) (e.g., destination ID(s) or group ID) is the same as SCI-2. In this example, no additional intended recipient information for SCI-3 is included in the SCI-2 or SCI-3. In other examples, the SCI-3 may be intended for a different set of destination UE(s) than SCI-2. In this example, the SCI-2 may include the intended recipient information for SCI-3 or SCI-3 may include intended recipient information for the SCI-3 and SCI-2 may include an indication of the SCI-3 type (e.g., unicast or groupcast). The SCI generation circuitry 944 may further be configured to execute SCI generation software 954 stored in the computer-readable medium 906 to implement one or more of the functions described herein.

Figure 10:
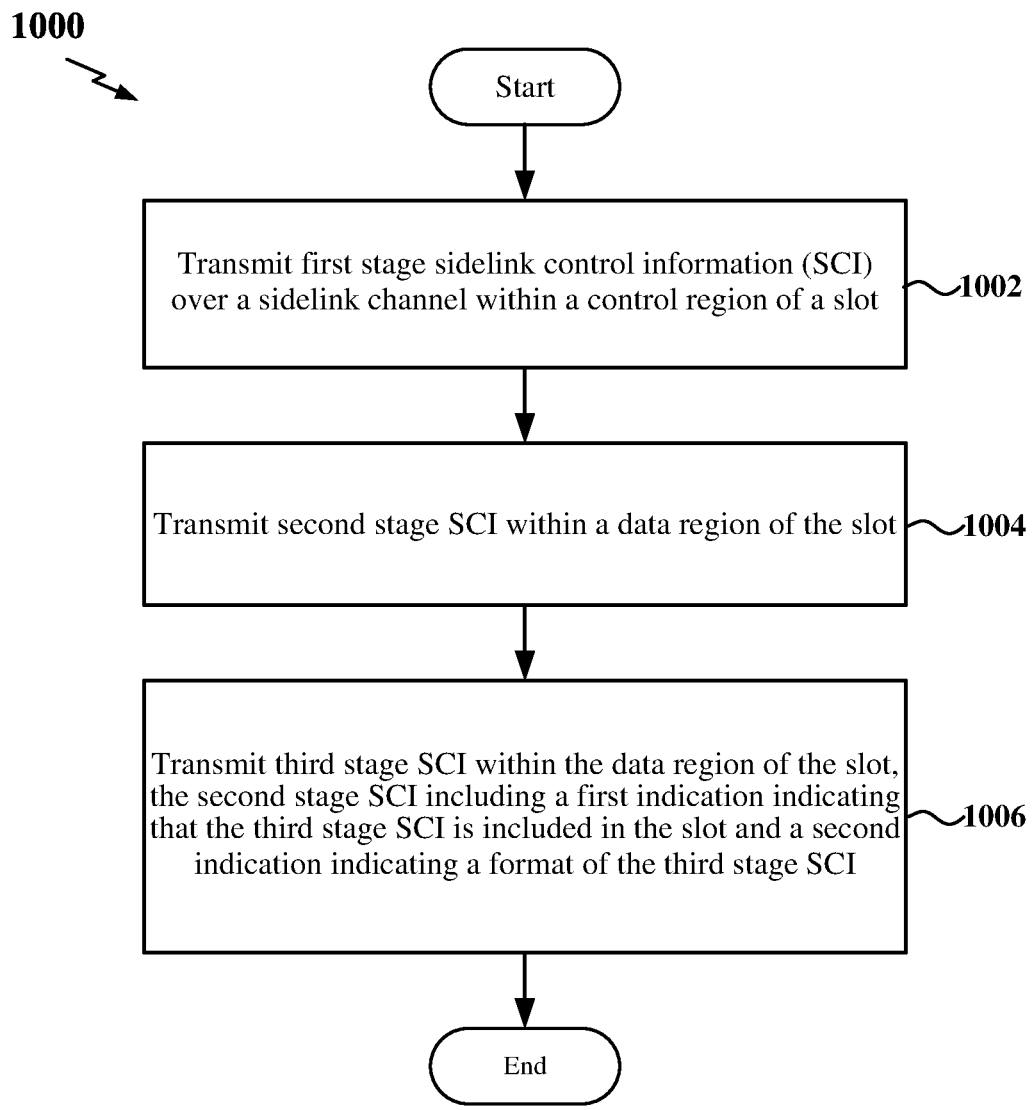
FIG. 10 is a flow chart of an exemplary method for sidelink communication using third stage sidelink control information according to some aspects.

FIG. 10 is a flow chart 1000 of an exemplary method for sidelink communication using third stage sidelink control information according to some aspects. As described below, some or all illustrated features may be omitted in a particular implementation within the scope of the present disclosure, and some illustrated features may not be required for implementation of all embodiments. In some examples, the method may be performed by the wireless apparatus 900, as described above and illustrated in FIG. 9, by a processor or processing system, or by any suitable means for carrying out the described functions.

At block 1002, the wireless apparatus (e.g., a UE configured for sidelink communication) may transmit first stage sidelink control information (SCI-1) over a sidelink channel within a control region of a slot. For example, the SCI generation circuitry 944, together with the communication and processing circuitry 942 and transceiver 910, shown and described above in connection with FIG. 9, may provide a means to transmit the SCI-1.

At block 1004, the wireless apparatus may transmit second stage SCI (SCI-2) within a data region of the slot. For example, the SCI generation circuitry 944, together with the communication and processing circuitry 942 and transceiver 910, shown and described above in connection with FIG. 9, may provide a means to transmit the SCI-2.

At block 1006, the wireless apparatus may transmit third stage SCI (SCI-3) within the data region of the slot. The SCI-2 can include a first indication indicating that the SCI-3 is included in the slot and a second indication indicating a format of the SCI-3. The format may indicate, for example, a resource size, rate-matching behavior, and modulation order of the SCI-3. In some examples, the SCI-3 may include unicast SCI, groupcast SCI, or broadcast SCI. In some examples, the SCI-2 may further include a third indication indicating whether sidelink data traffic is included in the slot. In this example, the wireless apparatus may further exclude sidelink data traffic from the slot when the third indication indicates that sidelink data traffic is not included in the slot. In another example, the wireless apparatus may further transmit the sidelink data traffic within the data region of the slot when the third indication indicates that the sidelink data traffic is included in the slot.

In some examples, the SCI-2 may further include intended recipient information identifying a first set of one or more destination sidelink devices (e.g., destination UEs) intended to receive the second stage SCI. In some examples, the SCI-3 lacks additional intended recipient information when the SCI-3 is intended to be received by the first set of one or more destination UEs. In some examples, the SCI-3 is intended to be received by a second set of one or more destination UEs. In this example, the SCI-2 can include second intended recipient information identifying the second set of one or more destination UEs intended to receive the SCI-3. In other examples, the SCI-3 can include second intended recipient information identifying the second set of one or more destination UEs intended to receive the SCI-3. In some examples, the SCI-2 includes a third indication indicating the SCI-3 includes unicast SCI or groupcast SCI. In this example, the second intended recipient information includes a single destination ID for the unicast SCI or a group ID for the groupcast SCI. In some examples, the second set of one or more destination UEs includes a subset of the first set of one or more destination UEs. For example, the SCI generation circuitry 944, together with the communication and processing circuitry 942 and transceiver 910, shown and described above in connection with FIG. 9, may provide a means to transmit the SCI-3.

Figure 11:
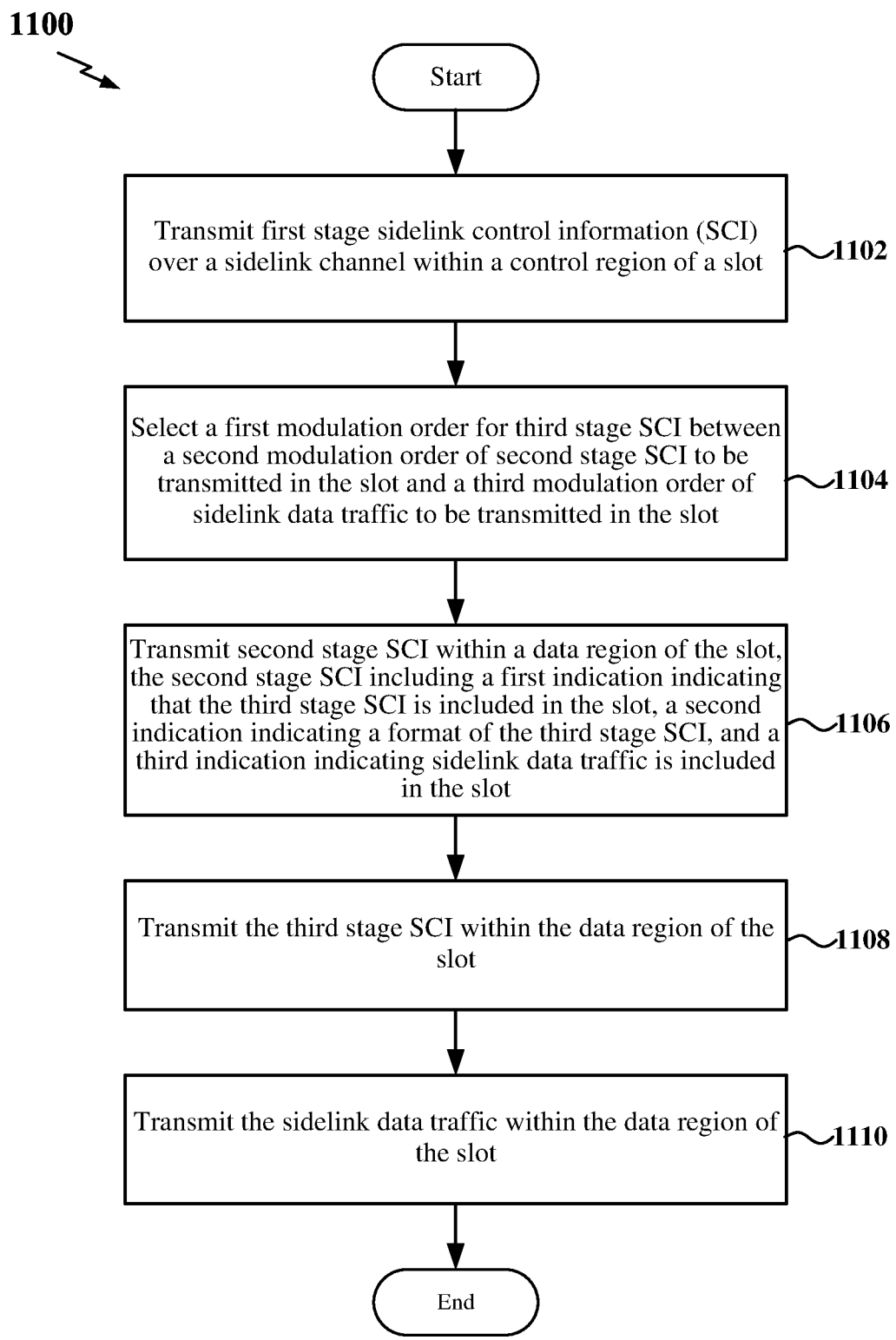
FIG. 11 is a flow chart of another exemplary method for sidelink communication using third stage sidelink control information according to some aspects.

FIG. 11 is a flow chart 1100 of another exemplary method for sidelink communication using third stage sidelink control information according to some aspects. As described below, some or all illustrated features may be omitted in a particular implementation within the scope of the present disclosure, and some illustrated features may not be required for implementation of all embodiments. In some examples, the method may be performed by the wireless apparatus 900, as described above and illustrated in FIG. 9, by a processor or processing system, or by any suitable means for carrying out the described functions.

At block 1102, the wireless apparatus (e.g., a UE configured for sidelink communication) may transmit first stage sidelink control information (SCI-1) over a sidelink channel within a control region of a slot. For example, the SCI generation circuitry 944, together with the communication and processing circuitry 942 and transceiver 910, shown and described above in connection with FIG. 9, may provide a means to transmit the SCI-1.

At block 1104, the wireless apparatus may select a first modulation order for third stage SCI (SCI-3) between a second modulation order of second stage SCI (SCI-2) to be transmitted in the slot and a third modulation order of sidelink data traffic to be transmitted in the slot. In some examples, the wireless apparatus may select the first modulation order to be equivalent to the second modulation order. In this example, the second modulation order may include QPSK for unicast SCI-2/SCI-3. In some examples, the wireless apparatus may select the first modulation order to be equivalent to the third modulation order. For example, the SCI generation circuitry 944 shown and described above in connection with FIG. 9 may provide a means to select the first modulation order of the SCI-3.

At block 1106, the wireless apparatus may transmit the SCI-2 within a data region of the slot. For example, the SCI generation circuitry 944, together with the communication and processing circuitry 942 and transceiver 910, shown and described above in connection with FIG. 9, may provide a means to transmit the SCI-2.

At block 1108, the wireless apparatus may transmit the SCI-3 within the data region of the slot. The SCI-2 can include a first indication indicating that the SCI-3 is included in the slot and a second indication indicating a format of the SCI-3. The format may indicate, for example, a resource size, rate-matching behavior, and modulation order of the SCI-3. In some examples, the SCI-3 may include unicast SCI, groupcast SCI, or broadcast SCI. In some examples, the SCI-2 may further include a third indication indicating that sidelink data traffic is included in the slot.

In some examples, the SCI-2 may further include intended recipient information identifying a first set of one or more destination sidelink devices (e.g., destination UEs) intended to receive the second stage SCI. In some examples, the SCI-3 lacks additional intended recipient information when the SCI-3 is intended to be received by the first set of one or more destination UEs. In some examples, the SCI-3 is intended to be received by a second set of one or more destination UEs. In this example, the SCI-2 can include second intended recipient information identifying the second set of one or more destination UEs intended to receive the SCI-3. In other examples, the SCI-2 can include second intended recipient information identifying the second set of one or more destination UEs intended to receive the SCI-3. In some examples, the SCI-2 includes a third indication indicating the SCI-3 includes unicast SCI or groupcast SCI. In this example, the second intended recipient information includes a single destination ID for the unicast SCI or a group ID for the groupcast SCI. In some examples, the second set of one or more destination UEs includes a subset of the first set of one or more destination UEs. For example, the SCI generation circuitry 944, together with the communication and processing circuitry 942 and transceiver 910, shown and described above in connection with FIG. 9, may provide a means to transmit the SCI-3.

At block 1110, the wireless apparatus may transmit the sidelink data traffic within the data region of the slot. For example, the communication and processing circuitry 942, together with the transceiver 910, shown and described above in connection with FIG. 9 may provide a means to transmit the sidelink data traffic.

Figure 12:
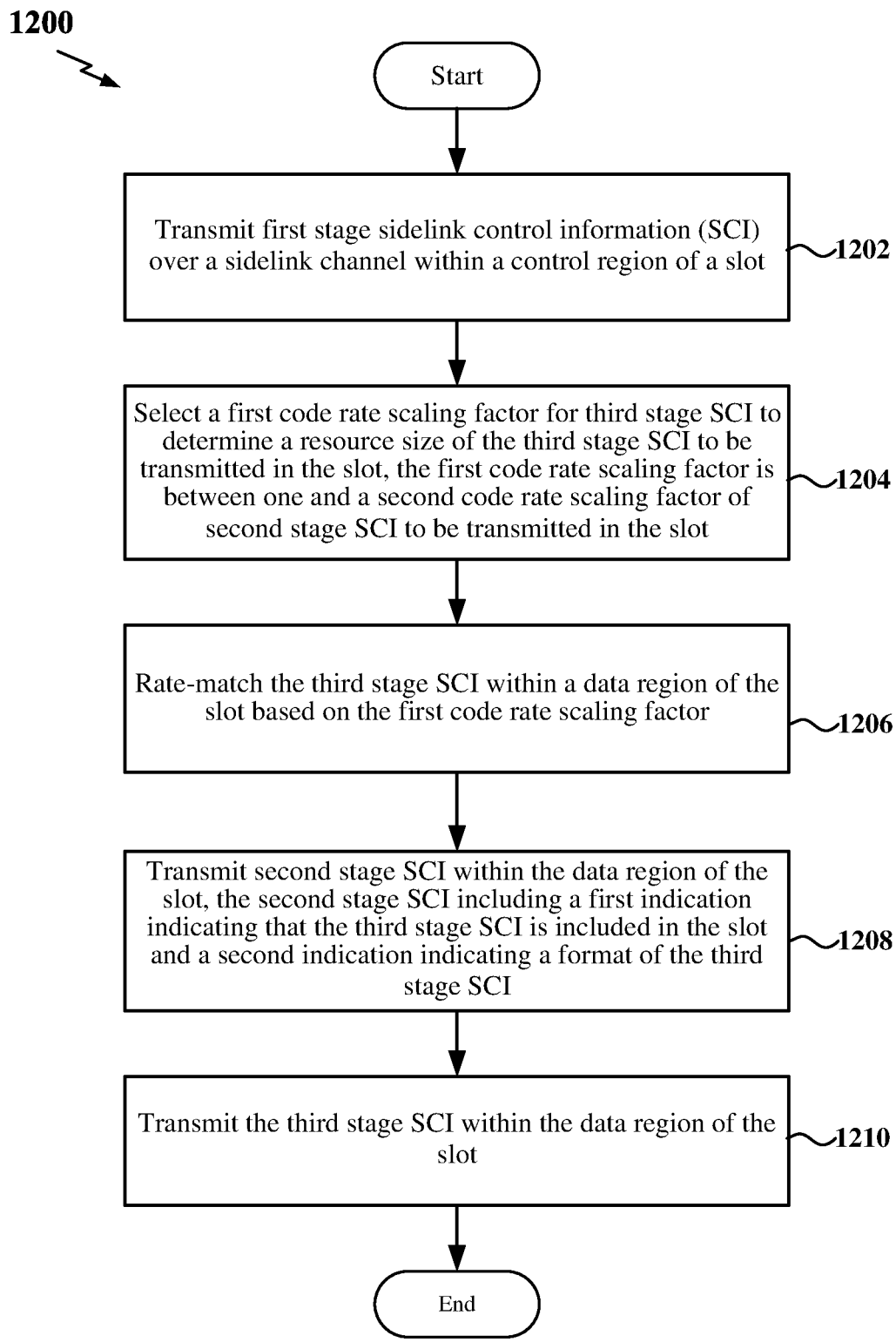
FIG. 12 is a flow chart of another exemplary method for sidelink communication using third stage sidelink control information according to some aspects.

FIG. 12 is a flow chart 1200 of another exemplary method for sidelink communication using third stage sidelink control information according to some aspects. As described below, some or all illustrated features may be omitted in a particular implementation within the scope of the present disclosure, and some illustrated features may not be required for implementation of all embodiments. In some examples, the method may be performed by the wireless apparatus 900, as described above and illustrated in FIG. 9, by a processor or processing system, or by any suitable means for carrying out the described functions.

At block 1202, the wireless apparatus (e.g., a UE configured for sidelink communication) may transmit first stage sidelink control information (SCI-1) over a sidelink channel within a control region of a slot. For example, the SCI generation circuitry 944, together with the communication and processing circuitry 942 and transceiver 910, shown and described above in connection with FIG. 9, may provide a means to transmit the SCI-1.

At block 1204, the wireless apparatus may select a first code rate scaling factor for third stage SCI (SCI-3) to determine a resource size of the SCI-3 to be transmitted in the slot. The first code rate scaling factor can be between one and a second code rate scaling factor of second stage SCI (SCI-2) to be transmitted in the slot. For example, the SCI generation circuitry 944 shown and described above in connection with FIG. 9 may provide a means to select the first code rate scaling factor for the SCI-3.

At block 1206, the wireless apparatus may rate-match the SCI-3 within a data region of the slot (e.g., corresponding to a PSSCH) based on the first code rate scaling factor. In some examples, the wireless apparatus may further rate-match the SCI-3 in two layers when the PSSCH transmission spans two layers. In some examples, the wireless apparatus may select the first code rate scaling factor to be equivalent to the second code rate scaling factor. In this example, the wireless apparatus may rate-match the SCI-3 from a first symbol following a second symbol carrying the SCI-2. In examples in which the PSSCH transmission spans two layers, the wireless apparatus may rate-match the SCI-3 on the two layers using a same rate-matching behavior used for the SCI-2. In some examples, the SCI-3 may be repeated (copied) on the second layer. In other examples, the wireless apparatus may select the first code rate scaling factor to be one. In this example, the wireless apparatus may rate-match the SCI-3 from a first symbol carrying the SCI-1. Here, the SCI-3 is frequency division multiplexed with the SCI-1. For example, the SCI generation circuitry 944 shown and described above in connection with FIG. 9 may provide a means to rate-match the SCI-3.

At block 1208, the wireless apparatus may transmit the SCI-2 within the data region of the slot. For example, the SCI generation circuitry 944, together with the communication and processing circuitry 942 and transceiver 910, shown and described above in connection with FIG. 9, may provide a means to transmit the SCI-2.

At block 1210, the wireless apparatus may transmit the SCI-3 within the data region of the slot. The SCI-2 can include a first indication indicating that the SCI-3 is included in the slot and a second indication indicating a format of the SCI-3. The format may indicate, for example, a resource size, rate-matching behavior, and modulation order of the SCI-3. In some examples, the SCI-3 may include unicast SCI, groupcast SCI, or broadcast SCI. In some examples, the SCI-2 may further include a third indication indicating that sidelink data traffic is included in the slot.

In some examples, the SCI-2 may further include intended recipient information identifying a first set of one or more destination sidelink devices (e.g., destination UEs) intended to receive the second stage SCI. In some examples, the SCI-3 lacks additional intended recipient information when the SCI-3 is intended to be received by the first set of one or more destination UEs. In some examples, the SCI-3 is intended to be received by a second set of one or more destination UEs. In this example, the SCI-2 can include second intended recipient information identifying the second set of one or more destination UEs intended to receive the SCI-3. In other examples, the SCI-3 can include second intended recipient information identifying the second set of one or more destination UEs intended to receive the SCI-3. In some examples, the SCI-2 includes a third indication indicating the SCI-3 includes unicast SCI or groupcast SCI. In this example, the second intended recipient information includes a single destination ID for the unicast SCI or a group ID for the groupcast SCI. In some examples, the second set of one or more destination UEs includes a subset of the first set of one or more destination UEs. For example, the SCI generation circuitry 944, together with the communication and processing circuitry 942 and transceiver 910, shown and described above in connection with FIG. 9, may provide a means to transmit the SCI-3.

In one configuration, the wireless apparatus 900 includes means for sidelink beam configuration and indication as described in the present disclosure. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1-3, and/or 6, and utilizing, for example, the processes and/or algorithms described herein in relation to FIGS. 10-12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 6 and/or 9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of sidelink wireless communication at a user equipment (UE), the method comprising:
   transmitting first stage sidelink control information (SCI) over a sidelink channel within a control region of a slot;
   transmitting second stage SCI within a data region of the slot; and
   transmitting third stage SCI within the data region of the slot, wherein the second stage SCI comprises a first indication indicating that the third stage SCI is included in the slot and a second indication indicating a format of the third stage SCI.

2. The method of claim 1, wherein the third stage SCI comprises unicast SCI, groupcast SCI, or broadcast SCI.

3. The method of claim 2, wherein the second stage SCI comprises first intended recipient information, wherein the first intended recipient information identifies a first set of one or more destination UEs intended to receive the second stage SCI.

4. The method of claim 3, wherein the third stage SCI lacks additional intended recipient information when the third stage SCI is intended to be received by the first set of one or more destination UEs.

5. The method of claim 3, wherein the third stage SCI is intended to be received by a second set of one or more destination UEs.

6. The method of claim 5, wherein the second stage SCI comprises second intended recipient information identifying the second set of one or more destination UEs intended to receive the third stage SCI.

7. The method of claim 5, wherein the third stage SCI comprises second intended recipient information identifying the second set of one or more destination UEs intended to receive the third stage SCI.

8. The method of claim 7, wherein the second stage SCI comprises a third indication indicating the third stage SCI comprises the unicast SCI or the groupcast SCI.

9. The method of claim 8, wherein the second intended recipient information comprises a single destination identity (ID) for the unicast SCI or a group ID for the groupcast SCI.

10. The method of claim 5, wherein the second set of one or more destination UEs comprises a subset of the first set of one or more destination UEs.

11. The method of claim 2, wherein the second stage SCI further comprises a third indication indicating whether sidelink data traffic is included in the slot.

12. The method of claim 11, further comprising:
   excluding the sidelink data traffic from the slot when the third indication indicates that the sidelink data traffic is not included in the slot.

13. The method of claim 11, further comprising:
   transmitting the sidelink data traffic within the data region of the slot when the third indication indicates that the sidelink data traffic is included in the slot.

14. The method of claim 13, further comprising:
   selecting a first modulation order for the third stage SCI, wherein the first modulation order is between a second modulation order of the second stage SCI and a third modulation order of the sidelink data traffic, and wherein the format indicates the first modulation order.

15. The method of claim 14, wherein the selecting the first modulation order further comprises:
   selecting the first modulation order to be equivalent to the second modulation order.

16. The method of claim 15, wherein the second modulation order comprises quadrature phase shift keying for the unicast SCI.

17. The method of claim 14, wherein the third stage SCI comprises the unicast SCI, and wherein the selecting the first modulation order further comprises:
   selecting the first modulation order to be equivalent to the third modulation order.

18. The method of claim 1, further comprising:
   selecting a first code rate scaling factor for the third stage SCI to determine a resource size of the third stage SCI, wherein the first code rate scaling factor is between one and a second code rate scaling factor of the second stage SCI, and wherein the format indicates the resource size; and
   rate-matching the third stage SCI within the data region of the slot based on the first code rate scaling factor.

19. The method of claim 18, wherein the selecting the first code rate scaling factor further comprises:
   selecting the first code rate scaling factor to be equivalent to the second code rate scaling factor.

20. The method of claim 19, wherein the rate-matching the third stage SCI further comprises:
   rate-matching the third stage SCI from a first symbol following a second symbol carrying the second stage SCI.

21. The method of claim 20, wherein the rate-matching the third stage SCI further comprises:
   rate-matching the third stage SCI on two layers using a same rate-matching behavior utilized for the second stage SCI.

22. The method of claim 18, wherein the selecting the first code rate scaling factor further comprises:
   selecting the first code rate scaling factor to be one.

23. The method of claim 22, wherein the rate-matching the third stage SCI further comprises:
   rate-matching the third stage SCI from a first symbol carrying the first stage SCI, wherein the third stage SCI is frequency division multiplexed with the first stage SCI.

24. The method of claim 18, wherein the rate-matching the third stage SCI further comprises:
   rate-matching the third stage SCI in two layers.

25. A wireless apparatus in a sidelink wireless communication network, comprising:
   a wireless transceiver configured to communicate over a sidelink channel;
   a memory; and
   a processor communicatively coupled to the wireless transceiver and the memory, wherein the processor and the memory are configured to:
      transmit first stage sidelink control information (SCI) over the sidelink channel within a control region of a slot via the wireless transceiver;
      transmit second stage SCI within a data region of the slot via the wireless transceiver; and
      transmit third stage SCI within the data region of the slot via the wireless transceiver, wherein the second stage SCI comprises a first indication indicating that the third stage SCI is included in the slot and a second indication indicating a format of the third stage SCI.

26. The wireless apparatus of claim 25, wherein the third stage SCI comprises unicast SCI, groupcast SCI, or broadcast SCI.

27. The wireless apparatus of claim 26, wherein the second stage SCI comprises first intended recipient information, wherein the first intended recipient information identifies a first set of one or more destination sidelink devices intended to receive the second stage SCI.

28. The wireless apparatus of claim 27, wherein the third stage SCI lacks additional intended recipient information when the third stage SCI is intended to be received by the first set of one or more destination sidelink devices.

29. The wireless apparatus of claim 27, wherein the third stage SCI is intended to be received by a second set of one or more destination sidelink devices.

30. A wireless apparatus in a sidelink wireless communication network, comprising:
- means for transmitting first stage sidelink control information (SCI) over a sidelink channel within a control region of a slot;
- means for transmitting second stage SCI within a data region of the slot; and
- means for transmitting third stage SCI within the data region of the slot, wherein the second stage SCI comprises a first indication indicating that the third stage SCI is included in the slot and a second indication indicating a format of the third stage SCI.

* * * * *